3,000,608
STOCK VALVE
John L. Williams, 17467 NE. West View Road,
Oswego, Oreg.
Continuation of application Ser. No. 400,664, Dec. 28, 1953. This application Aug. 25, 1959, Ser. No. 835,964
13 Claims. (Cl. 251—170)

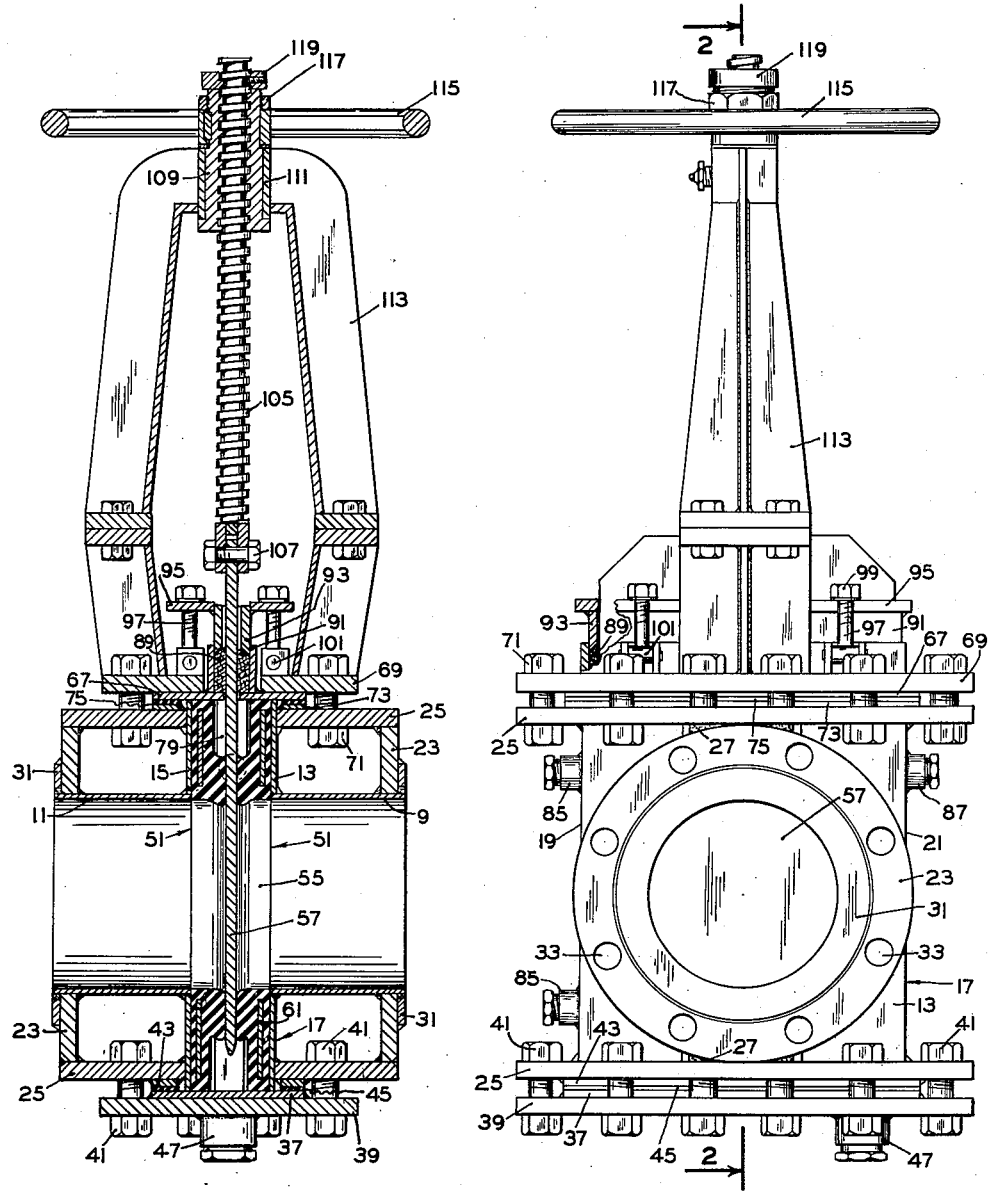

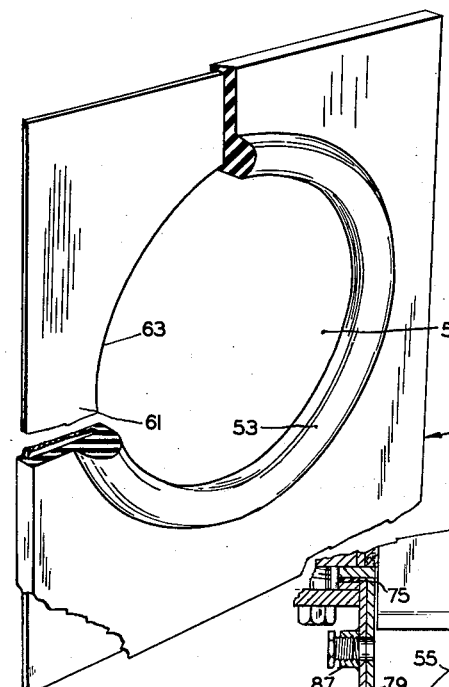
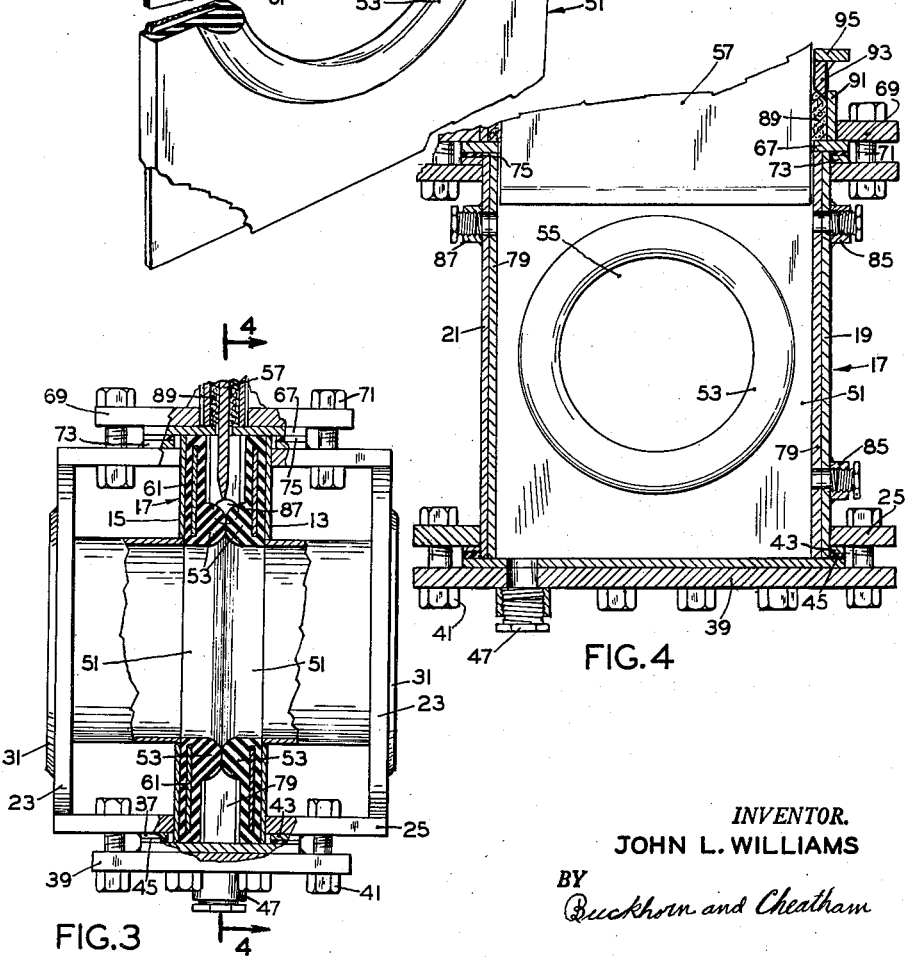

This invention relates to gate valves and particularly to gate valves for controlling the flow of slurries, such as paper stock. This application is a continuation of my prior application filed December 28, 1953, Serial No. 400,664, now abandoned, and entitled "Stock Valve."

At present, the conventional paper stock gate valve includes a rather expensive machined corrosion-resistant metal seat which is welded, bolted or otherwise secured to the valve body. When this valve seat is to be replaced, the valve must be removed from the line and the seat detached. This is a time consuming operation and, further, it disrupts operation of the system in which the valve is incorporated.

It is a general object of the present invention to provide a gate valve having a simple, inexpensive seat member which can be removed and replaced with the valve remaining in the line.

More particularly, it is an object of the present invention to provide a gate valve including a pair of seat members having inexpensive molded elastomer bodies, which seat members are designed to merely rest in unsecured relation within a valve chamber or chest and are adapted to be ejected from the chest by merely overcoming the frictional forces holding the seat members within the chest, with the valve remaining in the line, following removal of a closure plate. Further, these seat members are ported for the passage of paper stock therethrough and have sufficient sealing contact with opposing portions of the chamber walls to prevent the leakage of fluid therearound in by-passing relation to the ports therein, and have proper sealing engagement with the opposite sides of the gate of the valve, when the gate is in its closed position, to prevent leakage of fluid between the seat members and the gate.

An important feature of the present invention is the provision of seat members of the type described above, having rectangular plate-like configurations, whereby they may fit in non-shifting relation within and bear against the walls of a rectangular valve chamber to be properly supported thereby. Thus, the rectangular valve chamber may be formed of mill rolled plate without requiring any machined, cast or forged parts for enclosing or supporting the valve seat members.

It is a further object of the present invention to provide a valve having a pair of seat members of the type above indicated, wherein the seat members are provided with opposed annular beads immediately surrounding the ports in the seat members, and arranged in compressed sealing engagement with one another when the gate is elevated, and operable to form new sealing engagement with the gate as the gate is lowered. Thus, the annular beads prevent the passage of the acid-containing paper stock into the valve chamber, which would be objectionable both in that solid material in the stock would accumulate in the space through which the gate must pass, and also in that the acid-containing stock would collect in the chamber in a stagnant pool and pit the chamber walls.

It is still another object of the present invention to provide a seat member having an elastomer plate-like rectangular body which is ported for the passage of fluid therethrough, the body being self-supporting and essentially form-sustaining by being provided with a rectangular ported metal plate totally embedded within the elastomer body.

Various other objects of the present invention will be apparent from the following description taken in connection with the accompanying drawings wherein:

FIG. 1 is an end view of a gate valve embodying the concepts of the present invention;

FIG. 2 is a sectional view in side elevation taken along line 2—2 of FIG. 1, showing the gate in closed position;

FIG. 3 is a side view of the lower portion of the valve disclosed in FIG. 1, with parts broken away for convenience in illustration, the gate being shown in its elevated position;

FIG. 4 is a sectional view taken along line 4—4 of FIG. 3; and

FIG. 5 is a perspective view of a seat member embodying the concepts of the present invention, parts being broken away and shown in section for convenience in illustration.

Referring to the accompanying drawings wherein similar reference characters designate similar parts throughout, the valve shown includes a cylindrical inlet member 9 and a similar size coaxially arranged cylindrical outlet member 11. These members fit into openings formed in and are welded to the flat end plates 13 and 15, respectively, of a rectangular valve chamber or chest, indicated generally at 17, in a manner to be flush with the inner surfaces of such end plates. The valve chamber or chest 17 includes flat side plates 19 and 21 (see FIG. 4), which are secured, such as by welding, to end plates 13 and 15 to form a rectangular passage intersecting at right angles the cylindrical passage formed by inlet and outlet members 9 and 11. Plates 13, 15, 19 and 21 may be considered as walls in part defining a seat member receiving cavity. Also, the end plates 13 and 15 may be considered as inlet and outlet walls of the valve body. The parts of the valve which will come in contact with the acid-containing paper stock are formed of corrosion resistant metal, such as stainless steel. Thus the above mentioned parts will be formed of such metal.

Surrounding and secured to the outer end of each of members 9 and 11 is an annular mild steel flange 23, and surrounding and secured to the upper and lower portions of chamber 17, adjacent the ends thereof, are rectangular mild steel chamber flanges 25. The above flanges are dimensioned so that the annular flanges may be secured, such as by welding, at the upper and lower portions thereof, to the rectangular flanges at 27 (see FIG. 1) to provide rigidity for the valve body.

Machined stainless steel rings 31 are welded to the outer faces of annular flanges 23 concentrically thereof, and are adapted to engage similar machined parts on the flanges of pipes. Bolt holes 33 are formed through annular flanges 23 to enable them to be fastened to pipe flanges.

Closing the bottom of the chamber or chest 17 is a closure plate which includes a relatively thin rectangular stainless steel plate 37 secured to a larger and thicker mild steel backing plate 39. Suitable nuts and bolts 41 secure the closure plate against the lower edges of the chest. Secured to the lower face of the lower chest flange 25 and surrounding the lower end of the chest is a rectangular loop-shaped stainless steel strip 43. Between strip 43 and the margins of thin stainless steel plate 37 is compressed a rectangular loop-shaped gasket or seal 45. A plugged purge nipple 47, the function of which will be presently explained, is fixed to backing plate 39 and communicates with the interior of the chest or chamber through suitable openings (see FIG. 4) formed in plates 37 and 39.

Slidably disposed within chamber 17 are two seat members 51 having rectangular plate-like elastomer bodies formed with opposed projecting annular beads 53. The walls of the chamber 17 may be considered as guides slidably receiving the seats 51. Beads 53 surround ports or openings 55 formed through the plates. The annular beads form a seal with the opposite faces of a gate 57, which is disposed between the seat members when the gate is in its closed position (see FIG. 2). The seat members have a combined thickness, taken through the portions having the beads, of an extent such that when the gate is elevated (see FIG. 3), the beads are disposed in compressed sealing engagement with one another and the outer planar faces of the seat members are disposed in sealing engagement with the inner walls of chamber plates 13 and 15.

Reinforcing or stiffening each seat member is a rectangular metal plate 61 having outer dimensions less than the corresponding ones of the associated elastomer body, and having an aperture or port 63 (see FIG. 5) larger than the port 55 of the seat member. The stiffening plate 61 (as shown in FIG. 5) is molded within the elastomer seat member body to be totally embedded therewithin with its port concentric with respect to the port of the seat member.

Clamped against the upper edges of chest or chamber 17, by means to be presently described, is a relatively thin stainless steel shiftable plate 67. Clamping plate 67 against the just mentioned edges is a relatively thick mild steel backing plate 69, which is free from plate 67 and is bolted to upper chamber flange 25 by nuts and bolts 71. Surrounding the upper portion of chamber 17 is a rectangular stainless steel loop 73, which is welded to the upper chamber flange 25 and between which and the margins of stainless steel plate 67 is clamped a rectangular gasket loop 75 (compare FIGS. 3 and 4).

The elastomer bodies of seat members 51 are dimensioned so that their upper and lower edges engage upper and lower plates 67 and 37, and so that their other edges engage side plates 19 and 21, thus to prevent the seat members from shifting within the chest. Therefore, the ports 55 in the seat members, which are dimensioned to have the same internal diameters as cylindrical inlet and outlet members 9 and 11, will be maintained in alignment with one another and with the inlet and outlet passages provided by the inlet and outlet members, even though the seat members are not secured to the walls of chamber 17.

Gate 57, previously mentioned, comprises a rectangular plate having the upper corners beveled (see FIG. 1), and its lower edge tapered to form a nose portion capable of sliding between the annular elastomer beads 53 and progressively break the sealing engagement between the beads, while simultaneously forming new sealing engagement with such beads. Thus, during opening and closing movements of the gate, paper stock is prevented from entering the cavities in the chest.

Provided in chamber 17 are wear plates 79 (compare FIGS. 3 and 4) which are welded to side plates 19 and 21, and are narrower than said side plates so as to fit between the side edges of the seat members (see FIG. 3). A pair of plugged purge nipples 85 are secured to side plate 19, and a single plugged purge nipple 87 is secured to side plate 21 (see FIG. 4). The nipples communicate with the interior of the chest by means of appropriate holes formed in the side plates and the wear plates.

Gate 57 extends through a rectangular opening formed in plate 69 and through a rectangular slit formed in plate 67 and also through rectangular loop-shaped packing 89 surrounding the gate and supported by the margins of plate 67 around the slit. Packing 89 is contained within a packing box 91, welded to plate 67, and is pressed downwardly and inwardly by a rectangular loop-shaped packing gland 93 which has beveled lower edges engaging the packing to force it into engagement with the gate. Gland 93 has outwardly extending side flanges 95 formed with U-shaped recesses in their outer margins through which extend the upper ends of T-shaped swing bolts 97. Nuts 99 are threaded on the upper ends of said bolts to force the packing gland downwardly, suitable lock washers being furnished therebeneath. The heads of the bolts are pivoted in pairs of lugs 101 fixed to backing plate 69. It is apparent that when bolts and nuts 71, previously mentioned, are loosened, the packing gland assembly, including plate 67, box 91, gland 93 and packing 89, may be slightly shifted relative to chamber 17 to enable gate 57 to self center itself between the annular beads 53 of seat members 51. Thereafter nuts and bolts 71 are tightened and the centered relation of the gate and the seat members is maintained.

The gate 57 is shown in its closed position in FIG. 2 and is adapted to be elevated by a screw 105 which has a clevised lower end connected by a bolt and nut 107 to the upper portion of gate 57. The screw is threadedly received adjacent its upper end by a sleeve type nut 109 which is rotatively mounted in a sleeve 111. Sleeve 111 is fixed to and between the upper ends of a pair of arms 113, the lower ends of which are secured, such as by welding, to plate 69. The arms are T-shaped in cross section as is apparent by a comparison of FIGS. 1 and 2.

Nut 109 has a bottom flange engaging the lower end of sleeve 111 (see FIG. 2) and has keyed thereto, above sleeve 111, a hand wheel 115. A nut 117 threads on the upper end of nut 109 to retain the hand wheel in place. A stop collar 119 is secured to the upper end of screw 105 to limit downward movement of the screw and thus downward movement of gate 57.

In operation, it is evident from FIG. 2 that the elastomer beads 53 are compressed in tight sealing engagement with the gate 57 when the gate is in its closed position. Thus, the paper stock in the line, in which the valve is incorporated, cannot leak between the gate and the beads into the cavities in chamber 17. Such action would be objectionable in that solids would tend to accumulate in such cavities and impede ready movement of the gate from its open position to its closed position. Also, such leakage would provide a pool of the acid-containing paper stock within the cavities just mentioned, where it would attack the exposed walls of the chamber. More serious, however, if such leakage should occur it would mean that the paper stock could leak past the closed gate and this action would tend to dehydrate the paper stock on the high pressure side of the gate, and thus form a log in the line and in the inlet side of the valve. When such a log forms the valve and the portion of the line containing the valve must be removed from the line to permit removal of the log. This disrupts the operation of the system for an objectionable length of time and consumes many man hours in carrying out such operations, which adds to the expense.

When the gate 57 is elevated from the FIG. 2 position, by turning the hand wheel 115, said gate is wiped clean by the beads 53 of solids adhering thereto, so that these solids are not carried into the chamber 17. Also, during such elevation the beads 53 spring back into engagement with one another to form a tight seal and thus prevent entrance of the paper stock into chamber 17. The provision of a tapered nose of the gate permits the beads to come into sealing engagement with one another simultaneously with elevation of the nose so that leakage does not occur during the time that the gate is being elevated. FIG. 3 shows the gate in its elevated position and the beads 53 in compressed sealing engagement.

It is pointed out that the seat members of the valve of the present invention are substantially less expensive than machined corrosion-resistant seat members, because the seat members of the present invention comprise molded elastomer bodies in which mild steel reinforcing plates are totally embedded. Furthermore, the seat members, having rectangular plate-like configurations, merely rest in unsecured relation within the chamber 17. Although being unsecured, the plates are prevented from shifting by virtue of the engagement of their edges with the side walls of the chamber and the upper and lower closure plates. It is apparent that the seat members of the present invention may be quickly and easily replaced, with the valve remaining in the line. This is so because the gate need only be elevated and the lower closure plate removed, whereupon as the gate is moved downwardly it will force the seat members out of the chamber 17. If new seat members are required they may be merely assembled with their beads in engagement and the two members inserted into the rectangular cavity of the chamber 17. As indicative of the type of elastomer material which has proved successful in actual use, seat members having elastomer bodies composed of 50 durometer rubber have been satisfactory when tested in experimental lines.

After continued experimental use over several months, it has been found that in one way or another some of the paper stock does gain entrance into the cavities of the chamber 17, and this should be removed to avoid damage to the valve and so that the solids in such accumulated paper stock will not interfere with easy operation of the gate 57. Such accumulated paper stock can be removed with the valve remaining in the line by merely unplugging purge nipples 47, 85 and 87 and running clean water into nipples 85 and 87 to wash the accumulated paper stock out through nipple 47.

An important advantage of the seat members of the present invention is that by their design they facilitate the formation of an inexpensive valve chamber in which they are supported. This valve chamber may be formed of mill rolled plates welded or otherwise secured together. Thus, no machining, forging or casting operations are necessary in order to provide proper support for the seat members. Also, no special parts machined or otherwise need be provided for fastening or securing these seat members to the walls of the valve chamber because, as previously mentioned, the seat members merely rest within the chamber with their edges engaging the side walls and the closure plates thereof, and thus are prevented from shifting within the chamber.

It is pointed out that by providing elastomer beads as seating elements for the metal gate 57, no galling of the gate against the seats is possible. Galling of the metal gate against the metal seats, conventionally provided, is frequently a considerable problem in paper stock gate valve operation.

Having described the invention in what is considered to be the preferred embodiment thereof, it is desired that it be understood that the invention is not to be limited by the specific details shown unless they constitute critical features of the present invention, all of which will be apparent by reference to the following claims.

I claim:

1. A valve comprising a valve body including a rectangular chest having spaced inlet and outlet walls, spaced side walls, a bottom wall and a top wall, a pair of seat members, each including a rectangular plate-like elastomer body fitting at its edges against the side, bottom and top walls of the chest to be supported thereby against shifting movement within the chest in directions in its plane, said chest having aligned inlet and outlet ports of the same size formed in said inlet and outlet walls in spaced relation to the boundaries of said walls, said seat members having aligned ports formed therein of the same size as the chest ports and disposed in alignment with said chest ports, said seat members having flat outer faces and having formed on their inner faces opposed elastomer annular beads projecting inwardly from said inner faces, in concentric relation to and immediately adjacent the seat member ports, said elastomer seat members having a combined thickness taken through the bead portions thereof slightly greater than the distance between the inlet and outlet chest walls to dispose the flat outer faces of the seat member bodies in compressed sealing engagement with the said chest walls, and to dispose said annular beads to continuous compressed sealing engagement with one another, the top wall of said chest having a gate opening formed therethrough, a gate extending through said opening and supported for movement between the annular beads and being operable to progressively break the seal between the beads as said gate moves therebetween and to simultaneously form new sealing engagement with the beads, and means for moving the gate toward and away from a position between the annular beads.

2. A gate valve comprising a valve body having a seat member receiving cavity defined by opposed, flat, parallel, inlet and outlet walls, and side and bottom walls, said inlet and outlet walls and said side walls being permanently secured together, a pair of generally flat seat members slidably and removably fitting within said cavity and having opposed annular elastomer beads, and a gate mounted for movement to and from a position between the beads, the combined thickness of said members taken through the bead portions thereof being greater than that between the inlet and outlet walls to cause said beads to be disposed in compressed sealing engagement, with said blade in the closed position of the latter so that when wear occurs on the beads, the compression against the blade is lessened but the seal is maintained.

3. A gate valve comprising a valve body having a seat member receiving cavity defined by opposed inlet and outlet walls, and side and bottom walls, a pair of generally flat seat members removably fitting within said cavity having slidable engagement with said inlet and outlet walls and with said side walls, each of said seat members comprising a plate of elastomer material carrying a rigid reinforcing member so that said seat members are form sustaining within said cavity, said seat members having opposed annular elastomer beads, and a gate mounted for movement to and from a position between the beads, the combined thickness of said members taken through the bead portions thereof and of said blade being greater than the distance between the inlet and outlet walls of the body to cause said beads to be disposed in compressed sealing engagement with said blade in the closed position thereof so that when wear occurs on said beads, the compression of said beads against said blade will be lessened but the seal will be maintained.

4. A gate valve comprising a valve body including a hollow chest formed with spaced inlet and outlet ports defining in part a flow passage, said chest having an access opening formed therein offset from said passage but located between said ports, a pair of separate seat members within said chest and removable therefrom and insertable thereinto through said access opening, a gate blade between said seat members and movable relative thereto, each seat member having an inner elastomer part surrounding said flow passage and sealingly engaging said blade, each seat member also having an outer elastomer part remote from said blade and surrounding said flow passage and sealingly engaging the interior of said chest in surrounding relation to the associated port.

5. A gate valve as defined in claim 4 in which the outer elastomer part of each seat member has portions in axial alignment with the inner elastomer part of such seat member so that pressure of contact of one elastomer part is transmitted axially through said seat member to the other elastomer part.

6. A gate valve as defined in claim 4 in which the distance between the portions of the interior of the chest engaged by said outer elastomer parts is less than the combined effective thicknesses of said blade and said seat members taken through said elastomer parts so that sealing engagement of said elastomer parts with said blade and chest interior is caused by the compression of said elastomer parts.

7. A gate valve comprising a valve body including a hollow chest formed with spaced inlet and outlet ports defining in part a flow passage, said chest having an access opening formed therein offset from said passage but located between said ports, a pair of separate seat members slidably received within said chest and removable therefrom and insertable thereinto through said access opening, a gate blade between said seat members and movable relative thereto, each seat member having an inner elastomer part surrounding said flow passage and sealingly engaging said blade, each seat member also having an outer elastomer part remote from said blade and surrounding said flow passage and sealingly engaging the interior of said chest in surrounding relation to the associated port, the outer elastomer part of each seat member having portions in axial alignment with the inner elastomer part of such seat member so that the pressure of contact of one elastomer part is transmitted axially through such seat member to the other elastomer part of such seat member, the distance between the portions of the interior of the chest engaged by said outer elastomer part being less than the combined thicknesses of said gate blade and said seat members taken through said elastomer parts so that sealing engagement of said elastomer parts with said blade and chest interior is caused solely by the compression of said elastomer parts because of the fit of the seat members and the blade within said chest.

8. A gate valve comprising a valve body including a hollow chest defined in part by permanently joined inlet and outlet walls and side walls, said chest being formed with spaced inlet and outlet ports in said inlet and outlet walls defining in part a flow passage, said chest having an access opening formed therein offset from said passage but located between said ports, a pair of separate seat members slidably received within said chest and removable therefrom and insertable thereinto through said access opening, a gate blade between said seat members and movable relative thereto and projecting through said opening, each seat member comprising a plate-like elastomer body reinforced by a relatively rigid reinforcing means to make each seat member self-supporting and form sustaining, each seat member having an inner elastomer portion surrounding said flow passage and sealingly engaging said blade, each seat member also having an outer elastomer portion remote from said blade and surrounding said flow passage and sealingly engaging the interior of said chest in surrounding relation to the associated port, at least some of the faces of the peripheral edges of said seat member having thrust engagement with the interior of said chest to support said seat members in a direction parallel to the planes of said seat members, the distance between the portions of the interior of said chest engaged by said outer elastomer portions being less than the combined thicknesses of said blade and said seat members taken through said elastomer portions so that sealing engagement of said elastomer portions with said blade and chest interior is caused by the compression of said elastomer portions created by the fit of said seat members and blade within said chest, said chest including a removable closure means for said opening through which said blade extends.

9. A gate valve comprising a valve body including a hollow chest formed with spaced inlet and outlet ports defining in part a flow passage, said chest having an access opening formed therein offset from said passage but located between said ports, a seat member slidably received within said chest and removable therefrom and insertable thereinto through said opening in a direction generally normal to said flow passage, a gate blade next to said seat member and movable relative thereto and projecting through said opening, said seat member having an inner elastomer part surrounding said flow passage and sealingly engaging said blade, said seat member also having an outer elastomer part remote from said blade and surrounding said flow passage and sealingly engaging the interior of said chest in surrounding relation to the associated port, the distance between said blade and the portion of said chest interior engaged by said outer elastomer part being less than the thickness of the seat member taken through said elastomer parts so that said elastomer parts are compressed because of the tight fit of the seat member between said blade and chest interior to thereby form effective seals between said elastomer parts and said blade and chest interior because of such compression.

10. A gate valve comprising a valve body fabricated of sections of metal plate, said body having a chest including flat, spaced inlet and outlet plate sections and other plate sections welded to said inlet and outlet plate sections and permanently securing them together, said chest being formed with inlet and outlet ports at said inlet and outlet plate sections, said chest having an access opening located between said ports but offset therefrom and defined by certain edges of said inlet and outlet plate sections and by certain edges of other of said plate sections, said chest including a closures means for said access opening, said chest providing a seat member pocket defined at least in part by said inlet and outlet plate sections and said closure means and certain of said other plate sections, a pair of separate platelike seat members slidably received within said chest and removable therefrom and insertable thereinto through said access opening, a gate blade between said seat members and movable relative thereto, each seat member being formed with a port therethrough, said seat members each having a peripheral shape conforming to the outline of said pocket so that said seat members are supported by edge contact with the interior walls of said chest and are located by virtue of such contact with their ports aligned with the chest ports, each seat member comprising an elastomer platelike body having an opening formed therethrough and having embedded therein a metal reinforcing element formed with an opening concentric with the just-mentioned opening, each elastomer body providing an inner elastomer part surrounding the flow passage of the valve and sealingly engaging said blade, each elastomer body also providing an outer elastomer part surrounding the flow passage and sealingly engaging the chest in surrounding relation to the associated port, the combined thicknesses of said seat members and blade taken through such elastomer parts being less than the distance between the inlet and the outlet plate sections so that the elastomer parts are pressed into sealing engagement with the parts they engage.

11. A gate valve comprising a valve body fabricated of sections of metal plate, said body having a chest including flat, spaced inlet and outlet plate sections and side plate sections welded to said inlet and outlet plate sections and permanently securing them together, said chest being formed with inlet and outlet ports at said inlet and outlet plate sections, said plate sections providing a pair of access openings located between said ports but offset therefrom and defined by the edges of said plate sections remote from said ports, said chest including a closure means for each access opening, said chest providing a seat member pocket defined by said plate sections and said closure means, a pair of separate platelike seat members slidably received within said chest and removable therefrom and insertable thereinto through an access opening, a gate blade between said seat members and movable relative thereto, each seat member being formed with a port therethrough, said seat members each having a peripheral shape conforming to the outline of said pocket so that said seat members are supported by edge contact with the interior walls of said chest and are located by virtue of such contact with their ports aligned with the chest ports, each seat member comprising an elastomer platelike body having an opening formed therethrough and having embedded therein a metal reinforcing element formed with an opening concentric with the just-mentioned opening, each elastomer body providing an inner elastomer part surrounding the flow passage of the valve and sealingly engaging said blade, each elastomer body also providing an outer elastomer part surrounding the flow passage and sealingly engaging the chest in surrounding relation to the associated port, the combined thicknesses of said seat members and blade taken through such elastomer parts being less than the distance between the inlet and the outlet plate sections so that the elastomer parts are pressed into sealing engagement with the parts they engage.

12. A gate valve comprising a valve body fabricated of sections of metal plate, said body having a chest including flat, spaced inlet and outlet plate sections and other plate sections welded to said inlet and outlet plate sections and permanently securing them together, said chest being formed with inlet and outlet ports at said inlet and outlet plate sections, said chest having an access opening located between said ports but offset therefrom and defined by certain edges of said inlet and outlet plate sections and by certain edges of other of said plate sections, said chest including a closure means for said access opening, said chest also providing another opening, a closure means for said another opening, said chest providing a seat member pocket defined at least in part by said inlet and outlet plate sections and said closure means and certain of said other plate sections, a pair of separate platelike seat members slidably received within said chest and removable therefrom and insertable thereinto through said access opening, a gate blade between said seat members and movable relative thereto and projecting through said another opening, means mounted on said body for moving said gate blade, said access opening being of a size to enable said seat members to be removed from or inserted into said chest through said access opening thereby facilitating such removal or insertion without the necessity of dismantling the gate blade and associated structure, each seat member being formed with a port therethrough, said seat members each having a peripheral shape conforming to the outline of said pocket so that said seat members are supported by edge contact with the interior walls of said chest and are located by virtue of such contact with their ports aligned with the chest ports, each seat member providing an inner elastomer part surrounding the flow passage of the valve and sealingly engaging said blade and an outer elastomer part surrounding the flow passage and sealingly engaging the chest in surrounding relation to the associated port, the combined thicknesses of said seat members and blade taken through such elastomer parts being less than the distance between the inlet and the outlet plate sections so that the elastomer parts are pressed into sealing engagement with the parts they engage.

13. A gate valve comprising a valve body fabricated of sections of metal plate, said body having a chest including flat, spaced inlet and outlet plate sections and other plate sections welded to said inlet and outlet plate sections and permanently securing them together, said chest being formed with inlet and outlet ports at said inlet and outlet plate sections, said chest having an access opening located between said ports but offset therefrom and defined by certain edges of said inlet and outlet plate sections and by certain edges of other of said plate sections, said chest including a closure means for said access opening, said chest providing a seat member pocket defined at least in part by said inlet and outlet plate sections and said closure means and certain of said other plate sections, a pair of separate platelike seat members slidably received within said chest and removable therefrom and insertable thereinto through said access opening, a gate blade between said seat members and movable relative thereto, each seat member being formed with a port therethrough, said seat members each having a peripheral shape conforming to the outline of said pocket so that said seat members are supported by edge contact with the interior walls of said chest and are located by virtue of such contact with their ports aligned with the chest ports, each seat member providing an inner elastomer part surrounding the flow passage of the valve and sealingly engaging said blade and also providing an outer elastomer part surrounding the flow passage and sealingly engaging the chest in surrounding relation to the associated port, the combined thicknesses of said seat members and blade taken through such elastomer parts being less than the distance between the inlet and the outlet plate sections so that the elastomer parts are pressed into sealing engagement with the parts they engage.

References Cited in the file of this patent

UNITED STATES PATENTS

| | | |
|---|---|---|
| 1,226,380 | Riley | May 15, 1917 |
| 1,295,394 | Voorhees | Feb. 25, 1919 |
| 1,545,696 | Riley | July 14, 1925 |
| 2,000,853 | Lange | May 7, 1935 |
| 2,732,170 | Shand | Jan. 24, 1956 |

FOREIGN PATENTS

| | | |
|---|---|---|
| 324,654 | Germany | Aug. 31, 1920 |

UNITED STATES PATENT OFFICE
CERTIFICATE OF CORRECTION

Patent No. 3,000,608                                          September 19, 1961

John L. Williams

It is hereby certified that error appears in the above numbered patent requiring correction and that the said Letters Patent should read as corrected below.

Column 8, line 20, for "closures" read -- closure --.

Signed and sealed this 27th day of February 1962.

(SEAL)
Attest:

ERNEST W. SWIDER                                                DAVID L. LADD
Attesting Officer                                                 Commissioner of Patents